US012195626B2

United States Patent
Zheng et al.

(10) Patent No.: US 12,195,626 B2
(45) Date of Patent: Jan. 14, 2025

(54) FLAME-RETARDANT NYLON COMPOSITE AND USE THEREOF

(71) Applicant: KINGFA SCI. & TECH. CO., LTD., Guangdong (CN)

(72) Inventors: Yiquan Zheng, Guangdong (CN); Xuefeng Jin, Guangdong (CN); Decai Feng, Guangdong (CN); Chao Ding, Guangdong (CN); Zeyu Hu, Guangdong (CN); Yong He, Guangdong (CN); Xianbo Huang, Guangdong (CN); Nanbiao Ye, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 670 days.

(21) Appl. No.: 17/418,854

(22) PCT Filed: Nov. 28, 2019

(86) PCT No.: PCT/CN2019/121747
§ 371 (c)(1),
(2) Date: Jun. 28, 2021

(87) PCT Pub. No.: WO2020/134845
PCT Pub. Date: Jul. 2, 2020

(65) Prior Publication Data
US 2022/0073741 A1    Mar. 10, 2022

(30) Foreign Application Priority Data

Dec. 28, 2018  (CN) .......................... 201811621621.6

(51) Int. Cl.
| | | |
|---|---|---|
| C08L 77/06 | (2006.01) | |
| C08K 3/02 | (2006.01) | |
| C08K 3/40 | (2006.01) | |
| C08K 5/05 | (2006.01) | |
| C08K 5/08 | (2006.01) | |
| C08K 7/14 | (2006.01) | |

(52) U.S. Cl.
CPC ............... *C08L 77/06* (2013.01); *C08K 3/02* (2013.01); *C08K 3/40* (2013.01); *C08K 5/05* (2013.01); *C08K 5/08* (2013.01); C08K 2003/026 (2013.01); *C08K 7/14* (2013.01); C08K 2201/003 (2013.01); C08L 2203/20 (2013.01)

(58) Field of Classification Search
CPC .. C08L 77/06; C08K 3/02; C08K 3/40; C08K 5/05; C08K 5/08; C08K 7/14; C08K 2003/026; C08K 2201/003; C08K 2201/20
See application file for complete search history.

(56) References Cited

U.S. PATENT DOCUMENTS

| | | | |
|---|---|---|---|
| 5,434,209 A | 7/1995 | Gareiss et al. | |
| 6,645,625 B2 | 11/2003 | Horold et al. | |
| 8,883,904 B2 | 11/2014 | Roth et al. | |
| 2004/0014888 A1* | 1/2004 | Fournier | C08L 83/04 |
| | | | 525/100 |

FOREIGN PATENT DOCUMENTS

| | | |
|---|---|---|
| CN | 1075728 | 9/1993 |
| CN | 102382460 | 3/2012 |
| CN | 109777094 | 5/2019 |
| EP | 0255901 | 2/1988 |

OTHER PUBLICATIONS

Fitzer, E., Kleinholz, R., Tiesler, H., Stacey, M.H., De Bruyne, R., Lefever, I. and Heine, M. (2000). Fibers, 5. Synthetic Inorganic. In Ullmann's Encyclopedia of Industrial Chemistry, (Ed.). https://doi.org/10.1002/14356007.a11_001. Accessed Jan. 17, 2024 (Year: 2000).*

"International Search Report (Form PCT/ISA/210) of PCT/CN2019/121747," mailed on Feb. 28, 2020, with English translation thereof, pp. 1-4.

* cited by examiner

*Primary Examiner* — Ling Siu Choi
*Assistant Examiner* — Andrea Wu
(74) *Attorney, Agent, or Firm* — JCIPRNET

(57) ABSTRACT

The present invention relates to a flame-retardant nylon composite and use thereof, including components: 55 parts to 80 parts of a nylon resin; 1 part to 30 parts of a red phosphorus; and 0.01 part to 2 parts of a phenolic substance. According to the present invention, by adding a small amount of the phenolic substance to the red phosphorus flame-retardant nylon composite, phosphorus precipitation can be effectively inhibited, and a phosphine precipitation amount can be reduced to 30 ppm or less, while good electrical performances can be maintained, which is applicable in fields of connectors, contactors, etc. in electronic appliances.

7 Claims, No Drawings

FLAME-RETARDANT NYLON COMPOSITE AND USE THEREOF

CROSS-REFERENCE TO RELATED APPLICATION

This application is a 371 of international application of PCT application serial no. PCT/CN2019/121747, filed on Nov. 28, 2019, which claims the priority benefit of China application no. 201811621621.6, filed on Dec. 28, 2018. The entirety of each of the above mentioned patent applications is hereby incorporated by reference herein and made a part of this specification.

BACKGROUND

Technical Field

The present invention relates to the technical field of engineering plastics, and particularly relates to a flame-retardant nylon composite and use thereof.

Description of Related Art

Red phosphorus flame-retardant nylon has the advantages of excellent electrical performances (CTI, and electric breakdown strength), a high flame-retardant efficiency, a low price, etc., and is widely applied to electrical, electronic and other industries. Red phosphorus is a very effective flame retardant and can be used in an oxygen-containing polymer. However, since red phosphorus reacts with water vapor in the atmosphere to form odorous and toxic phosphine, there is a stabilization treatment and coating required in the industry.

U.S. Pat. No. 5,434,209 discloses a method of improving red phosphorus precipitation, in which by using bisphenol Z or bisphenol S, a phosphine precipitation amount can be reduced to a lower level. U.S. Pat. No. 6,645,625 discloses a method of improving red phosphorus precipitation, in which by using silver or tin oxide, a phosphine precipitation amount can be reduced to 0.01 mg/g or less, but use of a metal element may affect electrical performances of the material. U.S. Pat. No. 8,883,904 discloses a method of improving red phosphorus precipitation, in which by using a mixture of silver and zinc oxide, a phosphine precipitation amount can be reduced to 15 ug/g, but likewise, use of a metal element may affect electrical performances of the material. Patent CN93101597 discloses a method of improving phosphorus precipitation, in which by using zinc oxide and zinc borate, the phosphorus precipitation in a red phosphorus flame-retardant nylon system can be reduced to a lower level, but zinc borate and the like may affect the mechanical performances.

The present invention unexpectedly discovered through research that by adding a small amount of a phenolic substance to a flame-retardant nylon composite, phosphorus precipitation can be effectively inhibited while good electrical performances can be maintained.

SUMMARY

An objective of the present invention is to provide a flame-retardant nylon composite, in which by adding a phenolic substance, phosphorus precipitation can be effectively inhibited while good electrical performances can be maintained.

The present invention is realized by the following technical solutions.

A flame-retardant nylon composite includes the following components in parts by weight:

55 parts to 80 parts of a nylon resin;
1 part to 30 parts of a red phosphorus; and
0.01 part to 2 parts of a phenolic substance.

Preferably, the phenolic substance is one or more of 2,5-di-tert-butylhydroquinone, o-methylhydroquinone, and 2-methylphenol. According to the present invention, by adding a small amount of the phenolic substance into the composite, phosphorus precipitation can be effectively inhibited while good electrical performances can be maintained. An additive amount of the phenolic substance is advisable to be 0.01 part to 2 parts based on total parts by weight of the nylon composite. If the additive amount is too low, an effect of inhibiting the phosphorus precipitation is not obvious. If the additive amount is too high, the precipitation may affect an appearance of the product.

Preferably, the nylon resin is one or more of PA66, PA6/10 and PA6/66.

The red phosphorus is used as a flame retardant in the composite. Preferably, a red phosphorus powder is used, having an average particle diameter of not more than 300 μm. Preferably, the average particle diameter is 1 μm to 100 μm.

As a further preferred solution, the flame-retardant nylon composite is characterized in that 8 parts to 55 parts of a glass fiber is further included in parts by weight. At least one type of the glass fibers from the following group is used: E glass, H glass, R,S glass, D glass, C glass and quartz glass. Particularly preferably, glass fiber made of E glass is used.

According to an actual performance requirement, the flame-retardant nylon composite of the present invention further includes 1 part to 5 parts as a weight content of a lubricant, a nucleation agent, an antistatic agent, etc. in parts by weight.

A preparation method of the flame-retardant nylon composite provided by the present invention can be obtained by the following method: weighing each raw material according to a certain ratio, premixing in a high-speed mixer to obtain a premix, and then putting the premix into a twin-screw extruder for melt mixing, and granulating by extrusion to obtain the flame-retardant nylon composite; wherein the twin-screw extruder has a screw L/D ratio being 40:1 to 48:1, a screw barrel temperature being 250° C. to 270° C., and a screw rotation speed being 200 rpm to 550 rpm.

The present invention also provides use of the flame-retardant nylon composite in electronic appliances.

The present invention also provides use of the phenolic substance in improving red phosphorus precipitation in the flame-retardant nylon composite. The phenolic substance is one or more of 2,5-di-tert-butylhydroquinone, o-methylhydroquinone, and 2-methylphenol. Based on a total weight of the flame-retardant nylon composite, an additive amount of the phenolic substance is 0.01 part to 2 parts.

Compared with the prior art, the present invention has the following advantages.

According to the present invention, by adding a small amount of the phenolic substance to the red phosphorus flame-retardant nylon composite, the phosphorus precipitation can be effectively inhibited, and a phosphine precipitation amount can be reduced to 30 ppm or less, while good electrical performances can be maintained, which is applicable in fields of connectors, contactors, etc. in electronic appliances.

DESCRIPTION OF THE EMBODIMENTS

The following embodiments are given to specifically describe the present invention, but the present invention is not limited thereto.

Raw materials used in Embodiments and Comparative Examples are now illustrated as follows, but the present invention is not limited to these materials:

PA66-a: PA66 50FWFS, industrial grade, ASCEND LLC;
PA66-b: 21ZLV, industrial grade, ASCEND LLC;
red phosphorus: RPM440B, with an average particle diameter is 40 μm, China Bluestar Chengrand Co., Ltd;
2,5-di-tert-butylhydroquinone: Aladdin Reagent (Shanghai) Co., Ltd;
o-methylhydroquinone: Aladdin Reagent (Shanghai) Co., Ltd;
silver powder, with a purity of 99.99% and a particle diameter of less than 0.1 μm, Aladdin Reagent (Shanghai) Co., Ltd;
zinc oxide: with a purity of 99.99%, metals basis, Aladdin Reagent (Shanghai) Co., Ltd.;
zinc borate: anhydrous zinc borate, with a particle diameter of 20 μm to 30 μm, Aladdin Reagent (Shanghai) Co., Ltd.; and
glass fiber: ECS301HP-3, Chongqing Polycomp International Corp.

Performance Test Methods:

Comparative Tracking Index (CTI): tested according to the IEC60112-2003 standard. Between platinum electrodes with a specified size, a certain voltage was applied, and a droplet of contaminated liquid (0.1% ammonium chloride) with a specified droplet volume was dripped at a determined height (30 mm) for determined time (30 s).

Phosphorus precipitation amount (ppm): deionized water, 2 g of a silver sheet, 2 g of a copper sheet and 6 g of red phosphorous particles were placed in an 80° C. oven respectively for 3 days, then the copper sheet and the silver sheet were washed with 100 ml of 0.1 mol/L hydrochloric acid solution, and a phosphorous content in the hydrochloric acid solution was determined by ICP-AES.

Embodiments 1 to 8 and Comparative Examples 1 to 3

Each raw material was weighed according to the ratios in Table 1, premixed in a high-speed mixer to obtain a premix, and then the premix was put into a twin-screw extruder for melt mixing, and granulated by extrusion to obtain the flame-retardant nylon composite; wherein the twin-screw extruder had a screw L/D ratio being 40:1 to 48:1, a screw barrel temperature being 250° C. to 270° C., and a screw rotation speed being 200 rpm to 550 rpm.

The composite prepared in each Embodiment and Comparative Example above was first injection-molded into a standard strip for testing according to a standard size, and then each performance test was carried out. Performance test data for each test sample are shown in Table 1.

TABLE 1

Specific ratios (parts by weight) of each component for each Embodiment and Comparative Example

| | Comparative Example 1 | Comparative Example 2 | Comparative Example 3 | Embodiment 1 | Embodiment 2 | Embodiment 3 | Embodiment 4 |
|---|---|---|---|---|---|---|---|
| PA66-a | 60 | 60 | 60 | 60 | 65 | 60 | 60 |
| RPM440B | 12 | 12 | 12 | 12 | 10 | 13 | 13 |
| Zinc borate | 0.3 | | | | | | |
| O-methylhydroquinone | | | | 0.5 | 0.5 | 0.8 | 0.3 |
| 2,5-di-tert-butyl-hydroquinone | | | | | 0.5 | | 0.3 |
| Silver | | | 0.1 | | | | |
| Zinc oxide | | | 0.1 | | | | |
| Glass fiber ECS301HP-3 | 25 | 25 | 25 | 25 | 25 | 25 | 25 |
| CTI (V) | 350 | 325 | 275 | 355 | 365 | 360 | 350 |
| Phosphorus precipitation amount (ppm) | 155 | 75 | 35 | 28 | 23 | 27 | 29 |

| | Embodiment 5 | Embodiment 6 | Embodiment 7 | Embodiment 8 |
|---|---|---|---|---|
| PA66-b | 60 | 60 | 60 | 43 |
| RPM440B | 9 | 12 | 13 | 7 |
| O-methylhydroquinone | | | | 0.2 |
| 2,5-di-tert-butyl-hydroquinone | 1.2 | 1 | 1.5 | 0.2 |
| Glass fiber ECS301HP-3 | 30 | 25 | 25 | 50 |
| CTI (V) | 400 | 375 | 350 | 300 |
| Phosphorus precipitation amount (ppm) | 29 | 16 | 23 | 30 |

It can be seen from the results in Table 1 that according to the present invention, by adding a small amount of a phenolic substance to the red phosphorus flame-retardant nylon composite, phosphorus precipitation can be effectively inhibited and a phosphine precipitation amount can be reduced to 30 ppm or less, while good electrical performances can be maintained.

What is claimed is:

1. A flame-retardant nylon composite, comprising the following components in parts by weight:
   55 parts to 80 parts of a nylon resin;
   1 part to 30 parts of a red phosphorus; and
   0.01 part to 2 parts of a phenolic substance,
   wherein the phenolic substance is o-methylhydroquinone.

2. The flame-retardant nylon composite according to claim 1, wherein the nylon resin is one or more of PA66, PA6/10 and PA6/66.

3. The flame-retardant nylon composite according to claim 1, wherein the red phosphorus is a red phosphorus powder, having an average particle diameter of not more than 300 μm.

4. The flame-retardant nylon composite according to claim 1, wherein 8 parts to 55 parts of a glass fiber is further comprised in parts by weight: at least one type of the glass fibers from the following group is used: E glass, H glass, R,S glass, D glass, C glass and quartz glass.

5. The flame-retardant nylon composite according to claim 1, wherein 1 part to 5 parts of one or more of a nucleating agent, an antistatic agent, and a lubricant is further comprised in parts by weight.

6. The flame-retardant nylon composite according to claim 3, the average particle diameter of the red phosphorus powder is 1 μm to 100 μm.

7. The flame-retardant nylon composite according to claim 4, wherein the glass fiber made of E glass is used.

\* \* \* \* \*